US008196820B2

(12) United States Patent
Coventry et al.

(10) Patent No.: US 8,196,820 B2
(45) Date of Patent: Jun. 12, 2012

(54) SELF-SERVICE TERMINAL

(75) Inventors: Lynne M. Coventry, Edinburgh (GB); Philip N. Day, Fife (GB); Stephen Swaine, Perthshire (GB)

(73) Assignee: NCR Corporation, Duluth, GA (US)

( * ) Notice: Subject to any disclaimer, the term of this patent is extended or adjusted under 35 U.S.C. 154(b) by 214 days.

(21) Appl. No.: 12/011,320

(22) Filed: Jan. 25, 2008

(65) Prior Publication Data

US 2009/0188973 A1 Jul. 30, 2009

(51) Int. Cl.
*G06K 15/00* (2006.01)

(52) U.S. Cl. ........ 235/383; 235/375; 235/379; 235/380; 902/8; 902/9

(58) Field of Classification Search .................. 235/375, 235/379, 383, 380; 705/16, 43, 73; 902/8, 902/9
See application file for complete search history.

(56) References Cited

U.S. PATENT DOCUMENTS

| | | | | |
|---|---|---|---|---|
| 4,529,118 | A * | 7/1985 | Granzow et al. | 232/43.3 |
| 4,659,008 | A * | 4/1987 | Howett et al. | 232/43.3 |
| 4,871,085 | A * | 10/1989 | Graef et al. | 221/4 |
| 5,561,281 | A * | 10/1996 | Eda et al. | 235/379 |
| 6,014,649 | A * | 1/2000 | Kobayashi et al. | 705/43 |
| 6,582,241 | B1 * | 6/2003 | Lutz, Jr. | 439/157 |
| 2002/0099873 | A1 * | 7/2002 | Hileman et al. | 710/1 |
| 2004/0178569 | A1 * | 9/2004 | Graef et al. | 271/264 |
| 2006/0097868 | A1 * | 5/2006 | Ingram et al. | 340/571 |
| 2007/0145115 | A1 * | 6/2007 | Savage et al. | 235/379 |

* cited by examiner

*Primary Examiner* — Ali Sharifzada
(74) *Attorney, Agent, or Firm* — Peter Priest

(57) ABSTRACT

A self-service terminal comprising a plurality of devices is described. The devices comprise: a racking handle for moving that device from an operational position to a maintenance position; a primary visual identifier (such as a bright color) associated with the racking handle, where the primary visual identifier is common for all of the racking handles and is not used for any part of the device except a racking handle; and a secondary visual identifier associated with any other parts of the device that may be safely touched, where the secondary visual identifier is visually distinct (for example, by using a different color) from the primary visual identifier.

14 Claims, 1 Drawing Sheet

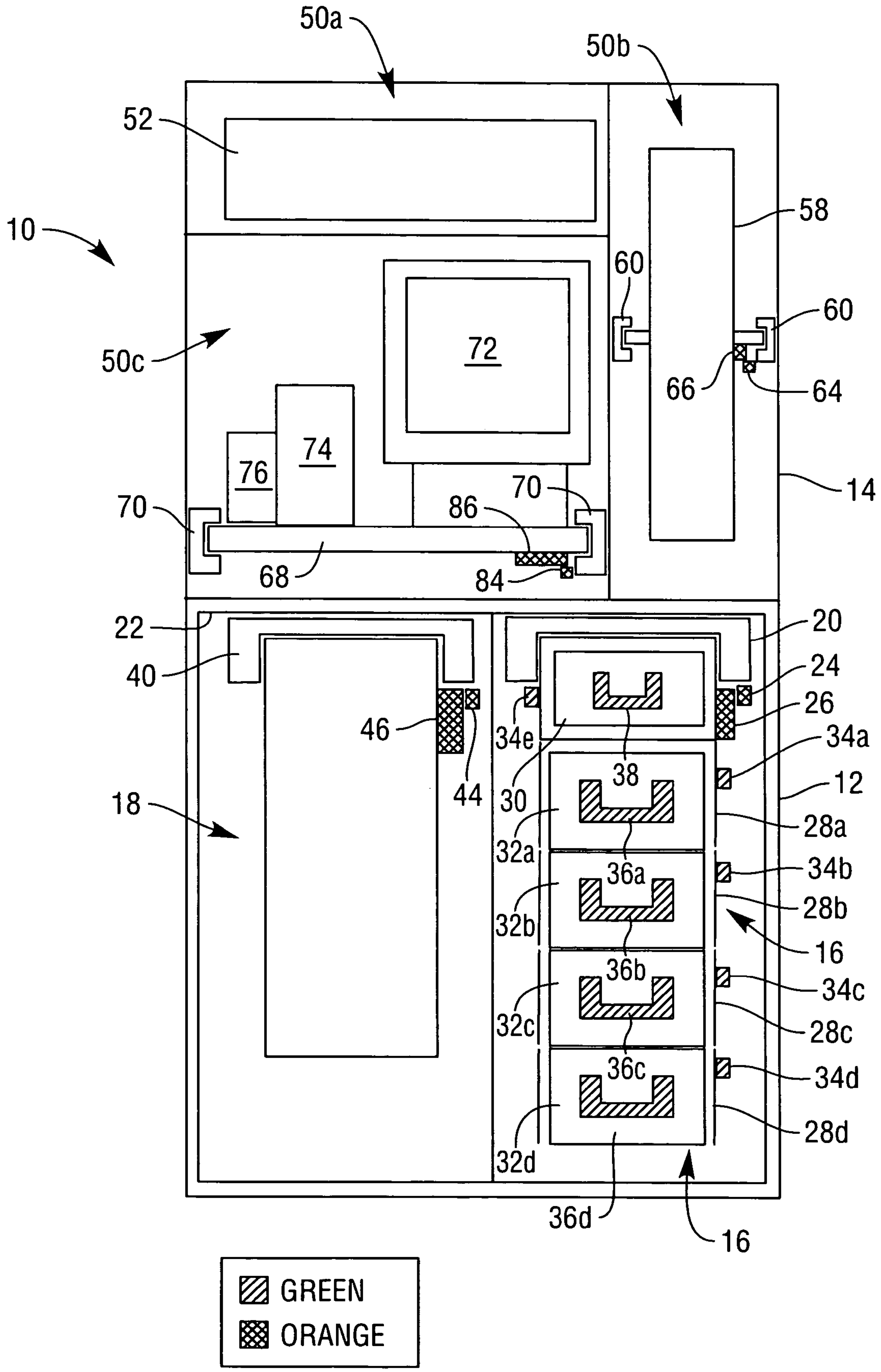
50a
50b
52
58
10
60
60
50c
72
66
64
74
76
14
70
70
86
68
84
22
20
40
24
26
46
34e
34a
44
38
18
30
12
32a
28a
36a
34b
32b
28b
36b
16
34c
32c
28c
36c
34d
32d
28d
36d
16
GREEN
ORANGE

SELF-SERVICE TERMINAL

FIELD OF INVENTION

The present invention relates to a self-service terminal.

BACKGROUND OF INVENTION

SSTs are public access devices that are suitable for allowing a customer to conduct a transaction or to access information in an unassisted manner and/or in an unattended environment.

Common examples of SSTs include automated teller machines (ATMs), information kiosks, financial services centers, bill payment kiosks, lottery kiosks, postal services machines, check-in and check-out terminals such as those used in the hotel, car rental, and airline industries, retail self-checkout terminals, vending machines, and the like.

A particularly important example of an SST is an automated teller machine (ATM). ATMs allow customers to perform financial transactions, such as cash withdrawal transactions. ATMs have a number of complex devices (such as a cash dispenser, a receipt printer, a card reader, and the like) stored in individual racks. Replenishing and servicing of these devices typically involves sliding a device out along parallel guides (referred to as racking out a device) to gain access to the device.

Devices typically comprise a plurality of sub-assemblies. Some parts of these sub-assemblies are safe to touch; whereas other parts may be sharp, hot, or otherwise dangerous to touch. Those points that are safe to touch are typically labeled, but some devices have a large number of such points. Distinguishing between multiple touch points to find the correct handle/latch to rack out the device can be difficult, which increases the risk of injury to replenishment and service personnel, and also the risk of damage to parts of the device being racked out.

SUMMARY OF INVENTION

Accordingly, the invention generally provides methods, systems, apparatus, and software for providing visually distinct areas at which a device can be safely touched.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a self-service terminal comprising a plurality of devices, each device comprising: a racking handle for moving that device from an operational position to a maintenance position; a primary visual identifier associated with the racking handle, where the primary visual identifier is common for all of the racking handles and is not used for any part of the device except a racking handle; and a secondary visual identifier associated with any other parts of the device that may be safely touched, where the secondary visual identifier is visually distinct from the primary visual identifier.

Although each of a plurality of devices has a racking handle, there may be additional devices that do not have a racking handle. For example, the terminal may include some devices that cannot be racked out, such devices would not have a racking handle, only those devices that can be racked out need a racking handle. Some devices may be commonly mounted on a tray, and the tray may be racked out using a racking handle.

The primary visual identifier may be a high visibility color, such as a fluorescent yellow, green, orange, or pink color similar to those colors used by highlighter pens.

The secondary visual identifier may be a color such as non-fluorescent green, blue, brown, or the like. The secondary visual identifier may be a high visibility color different to the high visibility color associated with the primary visual identifier.

The secondary visual identifier may be common for all of the devices, or unique for each device. For example, a cash dispenser may have green as the secondary visual identifier; whereas a currency recycler may have blue as the secondary visual identifier. Alternatively, a cash dispenser and currency recycler may both have green as the secondary visual identifier.

The secondary visual identifier may be associated with removal handles that are used to remove parts of a device from the rest of the device. For example, a removal handle may be a currency cassette handle.

The racking handles may be located in the same general location, or in one of two general locations (for example, upper right corner or lower right corner of the device) so that service or maintenance personnel can easily locate the racking handles.

The terminal may further comprise a tertiary visual identifier associated with parts of a device that may be used to remove the device from the terminal, where the tertiary visual identifier is visually distinct from both the primary visual identifier and the secondary visual identifier.

The terminal may be an ATM, a check-in/check-out terminal, a self-checkout terminal, a postal services terminal, or the like.

By virtue of this aspect, service or maintenance personnel can easily locate primary touchpoints (that is, the racking handles used to rack out devices) because these primary touchpoints are visually distinct. This reduces the risk of injury to the service or maintenance personnel and increases the likelihood of a replenishment or servicing operation being completed successfully.

As used herein, touchpoints relates to those parts of a terminal that may be safely touched by a user. A primary touchpoint is part of a device (or group of devices) that the user will typically have to interact with first of all, for example, to rack out a device to gain access to it. A secondary touchpoint is a part of a device that the user may interact with to remove, open, or operate on a sub-assembly of a device, for example, a currency cassette. Secondary touchpoints include handles, such as those used when clearing media jams in devices. A tertiary touchpoint is a part of a device that the user may only have to touch if he/she desires to remove the entire device from the terminal. A tertiary touchpoint includes handles that may be used to lift the device safely out of the terminal.

These and other aspects will be apparent from the following specific description, given by way of example, with reference to the accompanying drawing.

BRIEF DESCRIPTION OF THE DRAWING

FIG. 1 is a simplified, pictorial rear view inside a self-service terminal according to one embodiment of the present invention.

DETAILED DESCRIPTION

Reference is first made to FIG. 1, which is a simplified, pictorial rear view inside a self-service terminal 10 (in the form of an ATM) according to one embodiment of the present invention. This is the view that would be seen by a user during a replenishment or maintenance operation.

In FIG. 1, the ATM 10 comprises a safe 12 on top of which is mounted a chassis 14. To enable the internal devices of the ATM 10 to be seen more clearly, the ATM 10 is shown in FIG. 1 with the chassis door and safe door removed.

The safe 12 has two devices mounted therein: a cash dispenser 16 and a currency acceptor 18.

The cash dispenser 16 is mounted on a telescopic rail mechanism 20 slideably coupled to an upper, internal surface 22 of the safe 12. The telescopic rail mechanism 20 allows the cash dispenser 16 to be pulled out (referred to as racked out) for replenishment or servicing, and pushed back in (racked in) to engage with a dispenser slot (not shown) in the ATM fascia (not shown) for normal operation of the ATM. In operational mode the cash dispenser 16 is racked in; whereas, in maintenance mode, the cash dispenser 16 is racked out.

The telescopic rail mechanism 20 latches shut when the cash dispenser 16 is fully racked in, and is released by a user (who may be a replenishment person or a maintenance person) pushing a release lever 24 sideways, thereby allowing the user to rack out the cash dispenser 16 by pulling on a handle 26.

The release lever 24 and racking handle 26 are visually distinct, being coated or painted with a bright orange color (having a reference: RAL 2007), which forms a primary visual identifier. The release lever 24 and handle 26 are located at an upper right portion of the cash dispenser 16. This ensures that the user can easily locate the release lever 24 and racking handle 26 for racking out the device 16.

The cash dispenser 16 is a four-high dispenser comprising four pick units 28*a,b,c,d* that are vertically coupled together, and a purge bin 30 on top of the pick units 28. Each pick unit 28 receives and houses a currency cassette 32 from which the pick unit 28 picks individual banknotes.

Each currency cassette 32*a,b,c,d* is individually removable from the cash dispenser 16 by depressing a release latch 34 on the respective pick unit 28. The purge bin 30 is also individually removable by depressing a release latch 34*e*. The currency cassette 32 or purge bin 30 can then be removed using a cassette handle 36 or the purge bin handle 38 (which are removal handles).

The release latches 34, currency cassette handles 36, and purge bin handles 38 are all the same color, which in this embodiment is green (RAL 150 60 60). This green color is used to indicate a secondary visual identifier. This secondary visual identifier indicates to the user that these touchpoints 34,36,38 are for removing parts of the device, not for racking out the whole cash dispenser 16.

The currency acceptor 18 is also mounted on a telescopic rail mechanism 40 slideably coupled to the upper surface 22 of the safe 12. Telescopic rail mechanism 40 operates in the same way as telescopic rail mechanism 20; in fact, all of the telescopic rail mechanisms in the ATM 10 operate in a very similar or identical manner.

The telescopic rail mechanism 40 latches shut when fully racked in, and is released by a user pushing a release lever 44 sideways, thereby allowing the user to rack out the cash acceptor 18 by pulling on a racking handle 46.

In the same way as for the cash dispenser, the release lever 44 and racking handle 46 are visually distinct, being coated or painted with the same bright orange color (RAL 2007), which forms a primary visual identifier. The release lever 44 and racking handle 46 are located at an upper right portion of the cash acceptor 18. This ensures that the user can easily locate the release lever 44 and racking handle 46 for racking out the device 18.

The chassis 14 includes three compartments 50*a,b,c*. The first compartment 50*a* contains a PC core 52 (and associated power supply, temperature controller, and the like) that controls the operation of the ATM 10. The PC core 52 cannot be racked out; it is secured in place by screws.

The second compartment 50*b* contains a cheque processing module (CPM) 58. The CPM 58 is mounted on a telescopic rail mechanism 60 that is slideably coupled to a sidewall and an internal wall of the chassis 14. In a similar way to the other telescopic rail mechanisms, the telescopic rail mechanism 60 allows the CPM 58 to be racked out for replenishment or servicing, and racked in to engage with a cheque deposit slot (not shown) in the ATM fascia (not shown) for normal operation of the ATM.

The telescopic rail mechanism 60 latches shut when fully racked in, and is released by a user pushing a release lever 64 sideways, thereby allowing the user to rack out the CPM 58 by pulling on a racking handle 66.

In the same way as for the cash dispenser 16 and currency acceptor 18, the release lever 64 and racking handle 66 are visually distinct, being coated with the same bright orange color (RAL 2007), which forms a primary visual identifier. The release lever 64 and racking handle 66 are located at a right side of the CPM 58. This ensures that a user can easily locate the release lever 64 and racking handle 66 for racking out the device 58.

The third compartment 50*c* contains a tray 68 which is mounted on a telescopic rail mechanism 70 that is slideably coupled to a sidewall and an internal wall of the chassis 14. The tray 68 supports a plurality of devices, including: a rear operator panel touchscreen 72, a statement printer 74, a journal printer 76, and a motorized card reader/writer (not shown).

The rear operator panel touchscreen 72 allows the user to enter maintenance mode for performing replenishment and maintenance operations on the ATM 10.

The telescopic rail mechanism 70 latches shut when the tray 68 is fully racked in, and is released by a user pushing a release lever 84 sideways, thereby allowing the user to rack out the tray 68 by pulling on a racking handle 86.

In the same way as for the cash dispenser 16, currency acceptor 18, and CPM 58, the release lever 84 and racking handle 86 are visually distinct, being coated with the same bright orange color (RAL 2007), which forms a primary visual identifier. The release lever 84 and racking handle 86 are located at a lower right portion of the tray 68. This ensures that a user can easily locate the release lever 84 and racking handle 86 for racking out the tray 68 of devices.

Each device in the tray 68 may include secondary visual identifiers for use in interacting with the device, and/or tertiary visual identifiers for use in removing the device from the tray 68. For example, the statement printer 74 may have a yellow bar (not shown) that can be used to lift the statement printer 74 from the tray 68 once screws that secure the statement printer 74 to the tray 68 have been removed. The yellow color may be "RAL 085 80 80" indicating that it is a tertiary visual identifier.

It will now be appreciated that the above embodiment has the advantage that a user of the ATM, such as a currency handler or a maintenance person, can easily and quickly ascertain from looking at the devices in an ATM what touchpoints are: (i) primary touchpoints for racking out an entire device (or a group of devices), (ii) secondary touchpoints for interacting with a device (for example, by moving or removing part of the device); and (iii) tertiary touchpoints for removing a device from the ATM. This increases the speed, safety, and accuracy of replenishment and maintenance operations.

By locating primary touchpoints in one of three locations (upper right or middle right of a device if the device is located in a lower part of the ATM, or lower right or middle right of a device if the device is located in an upper part of the ATM), and by providing a consistent color scheme, a user can quickly identify primary touchpoints.

Various modifications may be made to the above described embodiment within the scope of the invention, for example, in other embodiments a different color system may be selected than that described above.

In the above embodiment only some of the touchpoints (mainly those on the cash dispenser 16) were illustrated for clarity and simplicity; in other embodiments, the other devices may each have a plurality of touchpoints.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

In the above embodiment, a separate handle and latch is provided; in other embodiments a touchpoint may be provided on some or all of the devices that have a single combined handle and latch assembly. In such a combined handle/latch assembly, a release lever may be incorporated into a racking handle such that pulling on the racking handle releases the device, thereby allowing it to be racked out.

What is claimed is:

1. A self-service terminal comprising a plurality of devices, each device comprising:

a racking handle for moving the device along a telescoping rail from an operational position within the self-service terminal on the telescoping rail to a maintenance position on the telescoping rail outside the self-service terminal;

a primary visual identifier in the form of a first color on the racking handle for distinguishing the racking handle, wherein the primary visual identifier is common for all of the racking handles for all of the plurality of devices and is not used for any part of the device except a racking handle;

a removal handle for removing a portion of the device from the device;

and a secondary visual identifier in the form of a second color which is on the removal handle for distinguishing the removal handle, wherein the second color of the secondary visual identifier is visually distinct from the first color of the primary visual identifier and is common for all of the removal handles for all of the plurality of devices and is not used for any part of the device except a removal handle.

2. A terminal according to claim 1, wherein the first color of the primary visual identifier is a high visibility color.

3. A terminal according to claim 1, wherein the racking handles are located in one of three general locations so that service personnel can easily locate the racking handles.

4. A terminal according to claim 1, wherein each device further comprises:

a device removal part for facilitating removal of the device from the self-service terminal; and a tertiary visual identifier in the form of a third color on the device removal part for distinguishing the device removal part, wherein the third color of the tertiary visual identifier is visually distinct from both the first color of the primary visual identifier and the second color of the secondary visual identifier and is common for all of the device removal parts for all of the plurality of devices.

5. A terminal according to claim 1, wherein one of the devices is a cash dispenser device.

6. A terminal according to claim 1, further comprising one or more devices that cannot be racked out and that do not have a racking handle.

7. A terminal according to claim 1, wherein a plurality of devices are commonly mounted as a group, and the group is racked out using a racking handle.

8. The self-service terminal of claim 1, further comprising a number of parts which cause harm if touched, wherein the primary visual identifier is also for distinguishing the racking handle from the parts which cause harm if touched, and wherein the secondary visual indicator is also for distinguishing the removal handle from the parts which cause harm if touched.

9. An automated teller machine comprising a plurality of devices, each device comprising:

a racking handle for sliding the device from an operational position within the self-service terminal on a telescoping rail to a maintenance position outside the self-service terminal of the telescoping rail; and a primary visual identifier in the form of a first color on the racking handle for distinguishing the racking handle, wherein the primary visual identifier is common for all of the racking handles for all of the plurality of devices, wherein each device further comprises:

a removal handle for removing a portion of the device from the device; and a secondary visual identifier in the form of a second color which is on the removal handle for distinguishing the removal handle, wherein the second color of the secondary visual identifier is visually distinct from the first color of the primary visual identifier and is common for all of the removal handles for all of the plurality of devices.

10. The automated teller machine of claim 9, wherein each device further comprises:

a release lever for releasing the device from the operational position, wherein the primary visual identifier is also on the release lever for distinguishing the release lever, and wherein the primary visual identifier is common for all of the release leavers for all of the plurality of devices.

11. The automated teller machine of claim 9, wherein each device further comprises:

a device removal part for facilitating removal of the device from the self-service terminal; and a secondary visual identifier in the form of a second color which is on the device removal part for distinguishing the device removal part, wherein the second color of the secondary visual identifier is visually distinct from the first color of the primary visual identifier and is common for all of the device removal parts for all of the plurality of devices.

12. The automated teller machine of claim 9 wherein a first of the plurality of devices comprises a cash dispenser and the portion of the device removed using the removal handle comprises a currency cassette.

13. The automated teller machine of claim 12 wherein a second of the plurality of devices comprises a currency acceptor.

14. The automated teller machine of claim 13 wherein a third of the plurality of devices comprises a cheque processing module.

* * * * *